(12) United States Patent
Fabick et al.

(10) Patent No.: US 7,924,368 B2
(45) Date of Patent: Apr. 12, 2011

(54) DIFFUSE MULTILAYER OPTICAL ASSEMBLY

(75) Inventors: Ryan T. Fabick, Stillwater, MN (US); Stephen J. Etzkorn, Woodbury, MN (US); Mark D. Gehlsen, Eagan, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 307 days.

(21) Appl. No.: 11/297,625

(22) Filed: Dec. 8, 2005

(65) Prior Publication Data

US 2007/0134438 A1    Jun. 14, 2007

(51) Int. Cl.
*G02F 1/1335* (2006.01)
(52) U.S. Cl. ............... 349/64; 349/61; 349/62; 349/63; 349/65; 349/66; 349/67; 349/68; 349/69; 349/70; 349/71; 359/599
(58) Field of Classification Search .............. 349/96, 349/61–71, 98; 428/1.1, 1.3, 1.31
See application file for complete search history.

(56) References Cited

U.S. PATENT DOCUMENTS

| | | | |
|---|---|---|---|
| 3,655,263 A | 4/1972 | Hoffman et al. | |
| 4,074,004 A | 2/1978 | Bateson et al. | |
| 4,415,509 A | 11/1983 | Toyooka et al. | |
| 4,737,559 A | 4/1988 | Kellen et al. | |
| 5,112,722 A | 5/1992 | Tsujino et al. | |
| 5,162,087 A | 11/1992 | Fukuzawa et al. | |
| 5,269,977 A | 12/1993 | Nakahashi et al. | |
| 5,540,978 A | 7/1996 | Schrenk | |
| 5,592,047 A | 1/1997 | Park et al. | |
| 5,751,388 A | 5/1998 | Larson | |
| 5,753,362 A | 5/1998 | Kawase et al. | |
| 5,793,456 A | 8/1998 | Broer et al. | |
| 5,825,543 A | 10/1998 | Ouderkirk et al. | |
| 5,867,316 A | 2/1999 | Carlson et al. | |
| 5,882,774 A | 3/1999 | Jonza et al. | |
| 5,914,560 A | 6/1999 | Winsor | |
| 6,042,945 A | 3/2000 | Maekawa | |
| 6,057,961 A | 5/2000 | Allen et al. | |
| 6,080,467 A | 6/2000 | Weber et al. | |
| 6,111,696 A | 8/2000 | Allen et al. | |
| 6,111,697 A | 8/2000 | Merrill et al. | |
| 6,122,103 A | 9/2000 | Perkins et al. | |
| 6,153,289 A | 11/2000 | Murray | |
| 6,163,351 A | 12/2000 | Nakayama | |
| 6,163,651 A * | 12/2000 | Washisu et al. ............ 396/55 |

(Continued)

FOREIGN PATENT DOCUMENTS

CN    1104325    6/1995

(Continued)

OTHER PUBLICATIONS

U.S. Appl. No. 60/690992, entitled "Diffuse Multilayer Optical Article", filed on Jun. 15, 2005.

*Primary Examiner* — David Nelms
*Assistant Examiner* — Thanh-Nhan P Nguyen
(74) *Attorney, Agent, or Firm* — Jay R. Pralle (57) ABSTRACT

An optical assembly includes a light diffusing layer attached to a reflective polarizing layer. An intermediate region between the light diffusing layer and the reflective polarizing layer includes an intermediate structure that defines voids between the light diffusing layer and the reflective polarizing layer.

13 Claims, 2 Drawing Sheets

U.S. PATENT DOCUMENTS

| | | |
|---|---|---|
| 6,282,821 B1 | 9/2001 | Freier et al. |
| 6,288,172 B1 | 9/2001 | Goetz et al. |
| 6,297,906 B1 | 10/2001 | Allen et al. |
| 6,307,676 B1 | 10/2001 | Merrill et al. |
| 6,341,879 B1 | 1/2002 | Skinner et al. |
| 6,343,865 B1 | 2/2002 | Suzuki |
| 6,352,761 B1 | 3/2002 | Hebrink |
| 6,359,670 B1 | 3/2002 | Broer |
| 6,368,699 B1 | 4/2002 | Gilbert et al. |
| 6,416,910 B1 | 7/2002 | Limura et al. |
| 6,448,339 B1 | 9/2002 | Tomita |
| 6,597,418 B2 | 7/2003 | Moon et al. |
| 6,613,619 B2 | 9/2003 | Yamazaki et al. |
| 6,627,300 B1 | 9/2003 | Kent |
| 6,636,363 B2 | 10/2003 | Kaminsky et al. |
| 6,692,137 B2 | 2/2004 | Blanchard |
| 6,706,339 B1 | 3/2004 | Miyatake et al. |
| 6,723,392 B1 | 4/2004 | Jinnal et al. |
| 6,723,772 B2 | 4/2004 | Maekawa |
| 6,760,157 B1 | 7/2004 | Kent |
| 6,771,335 B2 | 8/2004 | Kimura et al. |
| 6,783,850 B2 | 8/2004 | Takizawa et al. |
| 6,809,782 B1 | 10/2004 | Kawamoto et al. |
| 6,827,886 B2 | 12/2004 | Neavin et al. |
| 6,831,714 B2 | 12/2004 | Masaki et al. |
| 6,846,089 B2 * | 1/2005 | Stevenson et al. ............. 362/627 |
| 6,861,121 B2 * | 3/2005 | Matsunaga et al. ........... 428/141 |
| 6,992,822 B2 | 1/2006 | Ma |
| 7,010,212 B2 | 3/2006 | Emmons et al. |
| 7,072,096 B2 | 7/2006 | Holman et al. |
| 7,232,594 B2 * | 6/2007 | Miroshin et al. ............. 428/1.31 |
| 7,436,469 B2 | 10/2008 | Gehlsen |
| 7,446,827 B2 | 11/2008 | Ko et al. |
| 7,710,511 B2 | 5/2010 | Gehlsen |
| 2001/0008681 A1 | 7/2001 | Savant |
| 2001/0033349 A1 | 10/2001 | Honda et al. |
| 2001/0036546 A1 | 11/2001 | Kaytor et al. |
| 2002/0149712 A1 | 10/2002 | Kitamura |
| 2002/0159019 A1 | 10/2002 | Pokorny et al. |
| 2002/0167629 A1 | 11/2002 | Blanchard |
| 2002/0190406 A1 | 12/2002 | Merrill et al. |
| 2003/0017281 A1 | 1/2003 | Mizutani et al. |
| 2003/0118805 A1 | 6/2003 | Kretman et al. |
| 2003/0147042 A1 | 8/2003 | Kawamoto et al. |
| 2003/0164914 A1 | 9/2003 | Weber et al. |
| 2003/0192638 A1 | 10/2003 | Yang et al. |
| 2003/0214632 A1 | 11/2003 | Ma et al. |
| 2003/0223216 A1 * | 12/2003 | Emmons et al. ................ 362/31 |
| 2004/0061812 A1 | 4/2004 | Maeda |
| 2004/0067338 A1 | 4/2004 | Kaminsky et al. |
| 2004/0099992 A1 | 5/2004 | Merrill et al. |
| 2004/0099993 A1 | 5/2004 | Jackson et al. |
| 2004/0141103 A1 | 7/2004 | Kotchick |
| 2004/0202879 A1 | 10/2004 | Xia et al. |
| 2004/0229059 A1 | 11/2004 | Kaush et al. |
| 2004/0246697 A1 | 12/2004 | Yamashita et al. |
| 2005/0024558 A1 | 2/2005 | Toyooka |
| 2005/0046767 A1 | 3/2005 | Freking et al. |
| 2005/0140843 A1 | 6/2005 | Shimizu |
| 2005/0195588 A1 | 9/2005 | Kang et al. |
| 2006/0029784 A1 | 2/2006 | Doan et al. |
| 2006/0033860 A1 * | 2/2006 | Okishiro et al. ................ 349/70 |
| 2006/0291055 A1 * | 12/2006 | Gehlsen et al. ................ 359/486 |
| 2007/0134438 A1 | 6/2007 | Fabick |
| 2009/0122228 A1 | 5/2009 | Ko |
| 2010/0188754 A1 | 7/2010 | Gehlsen |

FOREIGN PATENT DOCUMENTS

| | | |
|---|---|---|
| CN | 1653386 | 8/2005 |
| CN | 1656395 | 8/2005 |
| EP | 881510 | 12/1998 |
| EP | 1553440 | 7/2005 |
| JP | 6-347764 | 12/1994 |
| JP | 10-048430 | 2/1998 |
| JP | 11-258411 | 9/1999 |
| JP | 15172931 | 6/2003 |
| JP | 16029694 | 1/2004 |
| WO | WO 84/03837 | 10/1984 |
| WO | WO 96/31794 | 10/1996 |
| WO | WO 97/23577 | 7/1997 |
| WO | WO 99/036262 | 7/1999 |
| WO | WO 99/56158 | 11/1999 |
| WO | WO 01/47711 | 7/2001 |
| WO | WO 03/034104 | 4/2003 |
| WO | WO 03/064526 | 8/2003 |
| WO | WO 03/102642 | 12/2003 |
| WO | WO 04/008236 | 1/2004 |
| WO | WO 04/074909 | 9/2004 |
| WO | WO 04/94549 A1 | 11/2004 |
| WO | WO 2004/111692 | 12/2004 |
| WO | WO 2005/024473 | 3/2005 |

* cited by examiner

DIFFUSE MULTILAYER OPTICAL ASSEMBLY

BACKGROUND

The present invention relates to optical films and optical displays incorporating the optical films. In particular, the present invention relates to a multilayer optical assembly comprising a reflective polarizing layer attached to a light diffusing layer with voids defined in an intermediate region therebetween.

Optical displays, such as liquid crystal displays (LCDs), are becoming increasingly commonplace, finding use for example in mobile telephones, in hand-held computer devices such as personal digital assistants (PDAs) and electronic games, and in larger devices such as laptop computers, LCD monitors, and LCD television screens. The incorporation of light management films into optical display devices results in improved display performance. Different types of films, including prismatically structured films, reflective polarizers, and diffuser films are useful for improving display parameters such as output luminance, luminance uniformity, viewing angle, and overall system efficiency. Such improved operating characteristics make devices easier to use and may also increase battery life.

Light management films incorporated into optical displays are typically stacked, one by one, into the display frame between a light source and a light gating device. The stack of films can be optimized to obtain a particular desired optical performance. From a manufacturing perspective, however, several issues can arise from the handling and assembly of several discrete film pieces. These problems include the excess time required to remove protective liners from individual optical films, along with the increased chance of damaging a film when removing a liner. In addition, the insertion of multiple individual sheets into the display frame is time consuming and the stacking of individual films provides further opportunity for the films to be damaged. All of these problems can contribute to diminished overall throughput or to reduced yield, which leads to higher system cost.

SUMMARY

In a first aspect, the present invention is an optical assembly including a light diffusing layer attached to a reflective polarizing layer. An intermediate region between the light diffusing layer and the reflective polarizing layer includes an intermediate structure that defines voids between the light diffusing layer and the reflective polarizing layer.

In a second aspect, the present invention is an optical assembly including a light management film and a light diffusing layer having a non-uniform major surface. A bonding layer bonds the light management film to the light diffusing layer such that voids between adjacent topographical features on the non-uniform major surface define air gaps between the light management film and the light diffusing layer.

In a third aspect, the present invention is an optical display assembly including a light gating device, a light source, and an optical assembly positioned between the backlight assembly and the light gating device. The optical assembly including a light diffusing layer attached to a light management layer. An intermediate region between the light diffusing layer and the light management layer includes an intermediate structure that defines voids between the light diffusing layer and the light management layer.

The above summary is not intended to describe each disclosed embodiment or every implementation of the present invention. The figures and the detailed description which follow more particularly exemplify illustrative embodiments.

The above-identified drawing figures set forth several embodiments of the invention. Other embodiments are also contemplated, as noted in the discussion. In all cases, this disclosure presents the invention by way of representation and not limitation. It should be understood that numerous other modifications and embodiments can be devised by those skilled in the art which fall within the scope and spirit of the principals of this invention. The figures may not be drawn to scale. Like reference numbers have been used throughout the figures to denote like parts.

DETAILED DESCRIPTION

Figure 1:
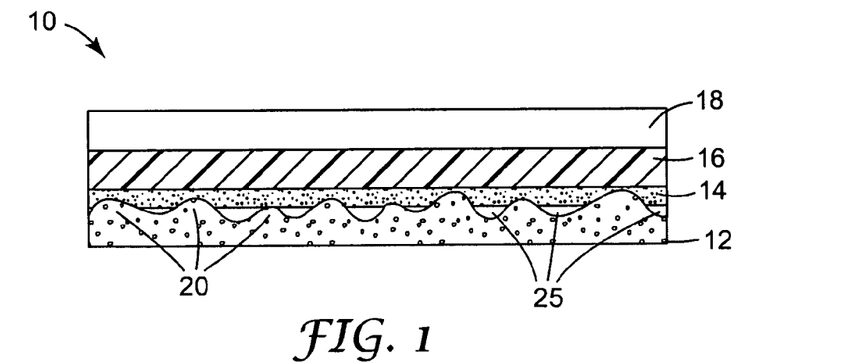
FIG. 1 is a schematic cross-sectional view of an optical assembly according to an embodiment of the present invention.

FIG. 1 is a schematic cross-sectional view of an optical assembly 10 according to an embodiment of the present invention. Optical assembly 10 includes light diffusing layer 12, bonding layer 14, reflective polarizing layer 16, and optional polymeric layer 18. Reflective polarizing layer 16 is attached to light diffusing layer 12 via bonding layer 14. Polymeric layer 18 is optionally attached to reflective polarizing layer 16 on the surface opposite bonding layer 14. Assembly 10 is typically incorporated in a display system between a light source and a light gating device.

Light diffusing layer 12 is used to diffuse light received from light sources, which results in an increase in the uniformity of the illumination light incident on the light gating device. Consequently, this results in an image perceived by the viewer that is more uniformly bright. In the embodiment shown in FIG. 1, light diffusing layer 12 is a diffuser plate having a non-uniform or textured surface. In one embodiment, light diffusing layer 12 has a transmission value in the range of about 40-90%, a haze value of greater than about 90%, and a half angle of greater than about 25°. Transmission and haze levels are defined according to ASTM-D1003-00, "Standard Test Methods for Haze and Transmittance for Transparent Plastics." Half angle is defined according to a test method that measures the luminance distribution as a collimated beam passes through an optical article at normal incidence. Under such conditions, the peak luminance is observed normal to the surface of the article. "Half angle" is the angle, relative to normal, where half the peak luminance is measured.

In another embodiment, the transmission is between about 50-75%, haze is greater than about 90%, and half-angle is greater than about 40°. In yet another embodiment, the transmission is between about 55-65%, haze is greater than about 90%, and half angle is greater than about 50°. A plurality of topographical features 20 forms the non-uniform surface of light diffusing layer 12. Topographical features 20 may be spaced periodically or aperiodically, may have similar or differing heights, and may have curved or pointed contours to form a matte or textured surface. In one embodiment, the average roughness (Ra) of the non-uniform surface is in the range of about 0.5-50 µm. The non-uniform surface of light diffusing layer 12 may be formed by, inter alia, coextrusion of a bead-filled layer, microreplication, roughening, or sandblasting of the surface.

In one embodiment, light diffusing layer 12 includes topographical features 20 that are non-uniformly spaced rounded beads or posts. The features 20 have a width along the non-uniform surface in the range of about 5-200 µm, and the height of the features relative to the non-uniform surface is in the range of about 25-100 µm. The distance between adjacent features 20 is in the range of about 10-200 µm. The average roughness (Ra) of the entire non-uniform surface is approximately 5.0 µm.

In another embodiment, the width of the features 20 is in the range of about 100-200 µm, the height of the features is in the range of about 25-50 µm, and the distance between adjacent features is in the range of about 10-200 µm. In yet another embodiment, the width of the features 20 is in the range of about 50-100 µm, the height of the features is in the range of about 50-75 µm, and the distance between adjacent features is in the range of about 10-200 µm. In still yet another embodiment, the width of the features 20 is in the range of about 5-50 µm, the height of the features is in the range of about 75-100 µm, and the distance between adjacent features is in the range of about 10-200 µm.

Reflecting polarizing layer 16 is used to increase the fraction of light emitted by the light sources in the optical system that passes through the light gating device, and so the image produced by the display system is brighter. Reflective polarizing layer 16 is attached to light diffusing layer 12 via bonding layer 14. In one embodiment, bonding layer 14 is laminated onto reflective polarizing layer 16, and subsequently attached to the non-uniform surface of light diffusing layer 12. Reflective polarizing layer 16 is attached to light diffusing layer 12 such that reflective polarizing layer 16 is bonded with topographical features 20 of the non-uniform surface. In one embodiment, bonding layer 14 has a thickness that is less than a height of topographical features 20. In another embodiment, bonding layer 14 has a thickness that is about 5-75% of a height of topographical features 20. When reflective polarizing layer 16 is attached to light diffusing layer 12 via bonding layer 14 according to the present invention, air gaps or voids 25 are defined between adjacent topographical features on the non-uniform surface of light diffusing layer 12. Bonding layer 14, topographical features 20, and voids 25 form an intermediate region between light diffusing layer 12 and reflective polarizing layer 16.

Optional polymeric layer 18 may provide a variety of functions, such as improved mechanical stability, scratch resistance, and optical function. For example, polymeric layer 18 may be a light directing layer to improve optical function by redirecting off-axis light in a direction closer to the axis of the display. If polymeric layer 18 is a light directing layer, the optical performance of the optical system is related to, inter alia, the fractional surface area of light diffusing layer 12 that is exposed to an air gap between light diffusing layer 12 and reflective polarizing layer 16. In particular, the on-axis brightness, gain, and contrast ratio of the optical system are affected by these parameters. However, providing a full air gap requires the separate assembly of the light diffusing layer and the reflective polarizing layer when assembling the optical system. This is time consuming and the stacking of individual layers provides opportunity for the layers to be damaged.

Assembly 10 allows the installation of all of these layers into the optical system at the same time. Voids 25 that are defined by adjacent topographical features 20 function to provide a partial air gap between light diffusing layer 12 and reflective polarizing layer 16. If the thickness of bonding layer 14 is less than the height of topographical features 20, reflective polarizing layer 16 is prevented from completely bonding with light diffusing layer 12 (i.e., complete optical coupling is avoided). Voids 25 allow assembly 10 to have an optical performance substantially similar to that of an assembly including a full air gap between light diffusing layer 12 and reflective polarizing layer 16. This performance is related to the surface area of the non-uniform surface of light diffusing layer 12 that is exposed to the air gap as defined by the height and shape of topographical features 20.

In addition, with voids 25 defined between light diffusing layer 12 and reflective polarizing layer 16, assembly 10 performs well from an environmental durability standpoint. In particular, assembly 10 performs substantially similarly before and after accelerated aging protocols, such as thermal shock (rapidly varying ambient temperature between −40° C. and 85° C.), high temperature with humidity (ambient temperature of 65° C. at 95% humidity for an extended period of time), and high temperature (ambient temperature of 85° C. for an extended period of time). Also, substantially fewer visual defects, such as blisters or dimples, form at the junction between light diffusing layer 12 and reflective polarizing layer 16 after accelerated aging compared to constructions formed without voids 25.

Light diffusing layer 12 may comprise one or more polymeric layers. Examples of polymers useful in the one or more polymeric layers include poly(meth)acrylics, poly(meth) acrylates, polycarbonates, polyurethanes, polyesters, polyolefins, polystyrenes, polycyclo-olefins, epoxy polymers, polyamides, polyimides, polysulfones, poly(vinyl chlorides), polysiloxanes, or silicone polymers, or copolymers or blends thereof. Examples include acrylic copolymers; polymethylmethacrylate; an acrylonitrile butadiene styrene copolymer; a styrene acrylonitrile copolymer, poly(vinylcyclohexane); polymethyl methacrylate/poly(vinylfluoride) blends; poly (ethylene); poly(propylene); PET; PEN; a poly(phenylene oxide) blend; a styrenic block copolymer; a polycarbonate/ PET blend; a vinyl acetate/polyethylene copolymer; a cellulose acetate; a fluoropolymer; a poly(styrene)-poly(ethylene) copolymer, or copolymers or blends thereof. In one embodiment, the polymeric layer comprises an acrylic sheet having the ACRYLITE® brand (from Cyro Industries, Rockaway, N.J.). In another embodiment, the polymeric layer comprises polymethylmethacrylate or a copolymer of methyl methacrylate and styrene.

Light diffusing layer 12 may comprise inorganic materials such as float glass, high-quality LCD glass, and/or borosilicate. In addition, light diffusing layer 12 may comprise organic, inorganic, or hybrid organic/inorganic particles, or combinations thereof that are useful for diffusing light. The particles may be solid, porous, or hollow, and they may be in the form of beads, shells, spheres, or clusters. The particles may be transparent. Examples of useful particles include polystyrene beads, polymethyl methylacrylate beads, polysiloxane beads, or combinations thereof. Other examples include titanium dioxide ($TiO_2$), calcium carbonate ($CaCO_3$), barium sulphate ($BaSO_4$), magnesium sulphate ($MgSO_4$), glass beads, and combinations thereof. Light diffusing layer 12 may also comprise voids or bubbles that may or may not be filled with a gas such as air or carbon dioxide. Furthermore, light diffusing layer 12 may be made diffuse by surface treatment such as roughening.

In addition, light diffusing layer 12 may comprise a combination of a substantially non-diffusing rigid substrate attached to a diffusing layer. Examples of light diffusing layers are described in U.S. Pat. No. 6,723,772, WO 2003/064526, and WO 2004/111692, the disclosures of which are incorporated herein by reference.

The light diffusing layer, 12, may be subjected to various treatments that modify the surfaces, or any portion thereof, as by rendering them more conducive to subsequent treatments such as coating, dying, metallizing, or lamination. This may be accomplished through treatment with primers, such as polyvinylvinylidene chloride, polymethylmethacrylate, epoxies, and aziridines, or through physical priming treatments such as corona, flame, plasma, flash lamp, sputter-etching, e-beam treatments, or amorphizing the surface layer to remove crystallinity, such as with a heated contacting roll.

The properties of light diffusing layer 12 may be tailored to provide particular optical and physical performance features depending on the application. For example, light diffusing layer 12 may be designed to exhibit a particular light transmission and haze value. Physical properties of light diffusing layer 12 may be adjusted by the choice of the polymeric material. The thickness of the layers, and the particular choice of particles, such as their size, shape, and amount, may be varied in order to adjust optical properties.

Additional components may be added to any one of the layers of the assembly 10. Examples include UV absorbers such as benzotriazoles, benzatriazines, and benzophenones, or combinations thereof. Light stabilizers such as hindered amine light stabilizers may also be added, and also heat stabilizers, optical brighteners, antistat materials, and phosphors. For a further description of components that may be added to the layers of assembly 10, see U.S. Pat. Nos. 6,723,772 and 6,613,619, which are incorporated herein by reference.

Any suitable type of reflective polarizer 16 may be used, for example, multi-layer optical film (MOF) reflective polarizers, diffuse reflective polarizer film (DRPF) such as continuous/disperse phase polarizers, wire grid reflective polarizers, or cholesteric reflective polarizers.

Both the MOF and continuous/disperse phase reflective polarizers rely on the difference in refractive index between at least two materials, usually polymeric materials, to selectively reflect light of one polarization state while transmitting light in an orthogonal polarization state. Some examples of MOF reflective polarizers are described in co-owned U.S. Pat. No. 5,882,774, incorporated herein by reference. Commercially available examples of a MOF reflective polarizers include Vikuiti™ DBEF-D200 and DBEF-D440 multi-layer reflective polarizers that include diffusive surfaces, available from 3M Company, St. Paul, Minn.

Examples of DRPF useful in connection with the present invention include continuous/disperse phase reflective polarizers as described in co-owned U.S. Pat. No. 5,825,543, incorporated herein by reference, and diffusely reflecting multi-layer polarizers as described in e.g. co-owned U.S. Pat. No. 5,867,316, also incorporated herein by reference. Other suitable types of DRPF are described in U.S. Pat. No. 5,751,388.

Some examples of wire grid polarizers useful in connection with the present invention include those described in U.S. Pat. No. 6,122,103. Wire grid polarizers are commercially available from, inter alia, Moxtek Inc., Orem, Utah.

Some examples of cholesteric polarizer useful in connection with the present invention include those described in, for example, U.S. Pat. No. 5,793,456, and U.S. Patent Publication No. 2002/0159019. Cholesteric polarizers are often provided along with a quarter wave retarding layer on the output side, so that the light transmitted through the cholesteric polarizer is converted to linear polarization.

In one embodiment, bonding layer 14 comprises an adhesive material, such as a pressure sensitive adhesive. A pressure sensitive adhesive refers to a viscoelastic material that displays aggressive tackiness and adheres well to a wide variety of substrates after applying only light pressure (e.g., finger pressure). An acceptable quantitative description of a pressure sensitive adhesive is given by the Dahlquist criterion, which indicates that materials having a storage modulus (G') of less than about $4.0 \times 10^5$ Pascals (measured at room temperature) have pressure sensitive adhesive properties.

The pressure sensitive adhesive polymer may comprise a copolymer of one or more acrylate or methacrylate monomers, collectively referred to as (meth)acrylate monomers or reinforcing monomers, that have the formula:

Formula (I)

wherein $R^1$ is H or $CH_3$, and $R^2$ is a linear, branched, aromatic, or cyclic hydrocarbon group, for example, an alkyl group comprising from about 1 to about 20 carbon atoms. $R^2$ may also include heteroatoms such as nitrogen, oxygen or sulfur.

Examples of suitable (meth)acrylate monomers include benzyl methacrylate, n-butyl acrylate, n-butyl methacrylate, cyclohexyl acrylate, cyclohexyl methacrylate, decyl acrylate, 2-ethoxy ethyl acrylate, 2-ethoxy ethyl methacrylate, ethyl acrylate, 2-ethylhexyl acrylate, ethyl methacrylate, n-hexadecyl acrylate, n-hexadecyl methacrylate, hexyl acrylate, hydroxy-ethyl methacrylate, hydroxy ethyl acrylate, isoamyl acrylate, isobornyl acrylate, isobornyl methacrylate, isobutyl acrylate, isodecyl acrylate, isodecyl methacrylate, isononyl acrylate, isooctyl acrylate, isooctyl methacrylate, isotridecyl acrylate, lauryl acrylate, lauryl methacrylate, 2-methoxy ethyl acrylate, methyl acrylate, methyl methacrylate, 2-methyl butyl acrylate, 4-methyl-2-pentyl acrylate, 1-methylcyclohexyl methacrylate, 2-methylcyclohexyl methacrylate, 3-methylcyclohexyl methacrylate, 4-methylcyclohexyl methacrylate, octadecyl acrylate, octadecyl methacrylate, n-octyl acrylate, n-octyl methacrylate, 2-phenoxy ethyl methacrylate, 2-phenoxy ethyl acrylate, propyl acrylate, propyl methacrylate, n-tetradecyl acrylate, n-tetradecyl methacrylate, and mixtures thereof.

In one embodiment, $R^2$ is a linear, branched, aromatic, or cyclic hydrocarbon group comprising from about 4 to about 12 carbon atoms. Examples include n-butyl acrylate, 2-ethylhexyl acrylate, isooctyl acrylate, isononyl acrylate, isodecyl acrylate, lauryl acrylate, and mixtures thereof.

The pressure sensitive adhesive polymer may comprise a (meth)acrylate monomer that, as a homopolymer, has a Tg of less than about 0° C.; and a reinforcing monomer that, as a homopolymer, has a Tg of at least about 20° C. The pressure sensitive adhesive polymer may comprise a (meth)acrylate monomer that, as a homopolymer, has a Tg of less than about −20° C.; and the reinforcing monomer that, as a homopolymer, has a Tg of at least about 50° C.

The pressure sensitive adhesive polymer may comprise the (meth)acrylate monomer in an amount of from about 40% by weight to about 98% by weight.

The pressure sensitive adhesive polymer may comprise the reinforcing monomer in an amount of up to about 20% by weight, or up to about 10% by weight. These reinforcing monomers can contain acidic or basic functionalities.

The pressure sensitive adhesive polymer comprises acid or base functionality which may be obtained by randomly polymerizing acidic or basic monomers, respectfully. In either case, the pressure sensitive adhesive polymer may comprise additional neutral monomers, referred to as non-acidic and non-basic monomers, respectively.

Acid functionality may be incorporated into the pressure sensitive adhesive polymer by copolymerizing acidic monomers such as ethylenically unsaturated carboxylic acids, ethylenically unsaturated sulfonic acids, ethylenically unsaturated phosphonic acids, and mixtures thereof. Ethylenically unsaturated carboxylic acids are useful because they are readily available. Sulfonic and phosphonic acid derivatives provide a strong interaction with basic functionality, which is useful when high cohesive strength, temperature resistance, and solvent resistance required. Particularly useful acidic monomers are acidic (meth)acrylates. Examples of acidic monomers are (meth)acrylic acid, itaconic acid, fumaric acid, crotonic acid, citraconic acid, maleic acid, oleic acid, B-carboxyethyl acrylate, 2-sulfoethyl methacrylate, styrene sulfonic acid, 2-acrylamido-2-methylpropane sulfonic acid, vinyl phosphonic acid, and mixtures thereof.

When the pressure sensitive adhesive polymer comprises acid functionality, the acidic monomers described above may be polymerized with non-acidic monomers. The amount of acid and non-acidic monomers may vary, and may depend on the desired properties of the pressure sensitive adhesive polymer, such as its cohesive strength. For example, acidic monomers may comprise from about 2% by weight to about 30% by weight, preferably from about 2% by weight to about 15% by weight.

In one embodiment, the pressure sensitive adhesive polymer comprises isooctyl acrylate and acrylic acid, prepared using methods described in U.S. Pat. No. 4,074,004.

The adhesive layer may comprise a crosslinker in order to provide cohesive strength of the layer. The crosslinker may be a thermal crosslinker such as a multifunctional aziridine, an isocyanate, or an epoxy. One example is 1,1'-(1,3-phenylene dicarbonyl)-bis-(2-methylaziridine). The crosslinker may also be a chemical crosslinker such as a peroxide, e.g., benzoyl peroxide. The crosslinker may also be a photosensitive crosslinker which is activated by high intensity ultraviolet light, e.g., benzophenone and copolymerizable aromatic ketone monomers as described in U.S. Pat. No. 4,737,559, or triazines, e.g., 2,4-bis(trichloromethyl)-6-(4-methoxy-pheynl)-s-triazine. The crosslinker may also be hydrolyzable, such as monoethylenic ally unsaturated mono-, di-, and trialkoxy silane compounds including, but not limited to, methacryloxypropyltrimethoxysilane (available from Gelest, Inc., Tullytown, Pa.), vinyldimethylethoxysilane, vinylmethyl diethoxysilane, vinyltriethoxysilane, vinyltrimethoxysilane, and vinyltriphenoxysilane. Crosslinking may also be achieved using high energy electromagnetic radiation such as gamma or e-beam radiation.

The particular choice and amount of crosslinker used in the blend may depend on the other polymers present in the blend, as well as the other layers in the optical assembly, and the application in which the optical assembly is used. Typically, the crosslinker is present in amounts of less than about 5 parts based on the total dry weight of the blend, and more specifically, from about 0.01 parts to 1 part.

The pressure sensitive adhesive polymer may be prepared by any conventional free radical polymerization method, including solution, radiation, bulk, dispersion, emulsion, and suspension processes. Free radical initiators and photoinitiators, chain transfer agents. Details of these processes may be found in, for example, WO 97/23577.

The adhesive layer may comprise additives such as tackifiers, plasticizers, UV absorbers, etc., such as that shown and described in WO 97/23577.

The dry thickness of the adhesive layer may be from about 0.05 micrometers to about 100 micrometers.

The pressure sensitive adhesive may be applied to reflective polarizing layer 16 or light diffusing layer 12 using conventional coating methods such as gravure coating, curtain coating, slot coating, spin coating, screen coating, transfer coating, brush coating, or roller coating. The blend may also be hot-melt coated. For most coating methods, the blend may additionally comprise a solvent which may be removed after the coating operation. The percent solids of the blend may vary depending on the coating method and the particular chemical identities of the pressure sensitive adhesive polymer and the crosslinker. The blend may also be coated onto a release liner such as paper and film liners coated with release agents such as silicones, fluorocarbons, etc. An example is the T-30 liner available from CPFilms Inc., Martinsville, Va. The release liner may then be removed. Whether applied directly to the reflective polarizing layer, the light diffusing layer, or a release liner, the remaining layers of the optical assembly may then be laminated to the adhesive layer.

It is desirable that the adhesive layer maintains a consistent optical performance over the useful life of optical assembly 10. The adhesive layer should also maintain bond strength, integrity, and stability, and not exhibit delamination or bubbling over time and under a variety of environmental conditions, as may be estimated using accelerated aging tests. Such test conditions may include thermal shock (−40 C to 85 C, 100 cycles), temperature extremes (−40 C, 85 C), high heat/humidity, and heat/ultraviolet exposure.

In one embodiment, the adhesive layer comprises a blend of a majority of a pressure sensitive adhesive polymer having acid or base functionality, a high Tg polymer having a Tg of greater than about 20° C. and having acid or base functionality, and a crosslinker, such as that shown and described in U.S. patent application Ser. No. 10/411,933, the disclosure of which is herein incorporated by reference. The functionality of the pressure sensitive adhesive polymer and the functionality of the high Tg polymer form an acid-base interaction when mixed. The adhesive crosslink density, modulus, and tack properties are designed so that adequate bond is maintained between the layers over the lifetime of the device. In addition, the adhesive properties are controlled so that the adhesive does not flow into voids 25 during operation, which would detrimentally affect the optical performance of optical assembly 10.

In another embodiment, the pressure sensitive adhesive polymer may comprise a polyurethane, a polyolefin, a tackified natural rubber, a synthetic rubber, a tackified styrene block copolymer, a silicone, a polyvinyl ether, or a combination thereof. The pressure sensitive adhesive polymer may comprise a copolymer of one or more vinyl esters (e.g., vinyl acetate), styrene, substituted styrene (e.g., a-methyl styrene), vinyl halide, vinyl propionate, and mixtures thereof. Other useful vinyl monomers include macromeric (meth)acrylates such as (meth)acrylate-terminated styrene oligomers and (meth)acrylate-terminated polyethers, such as are described in WO 84/03837. The pressure sensitive adhesive polymer may be a waterborne emulsion or dispersion.

In another embodiment, the adhesive layer may comprise a heat-activated adhesive. In addition, the adhesive layer may comprise a radiation-curable adhesive as described in U.S. application Ser. No. 10/914,555, filed Aug. 9, 2004, the disclosure of which is herein incorporated by reference.

In other embodiments, light diffusing layer 12 may be bonded to reflective polarizing layer 16 around a periphery of the layers by perimeter or edge bonding. That is, rather than providing bonding layer 14 to completely coat a major surface of reflective polarizing layer 16, bonding layer 14 may bond light diffusing layer 12 to reflective polarizing layer 16 around a periphery of these layers outside of the optically active portions of the layers. Alternatively, rather than bonding light diffusing layer 12 to reflective polarizing layer 16 using an adhesive, light diffusing layer 12 may be bonded to reflective polarizing layer 16 around a periphery of the layers using solvent bonding, ultrasonic welding, or laser welding. In essence, light diffusing layer 12 may be bonded to reflective polarizing layer 16 using any bonding method that does not affect the performance of the optically active area of assembly 10.

Polymeric layer 18 is an optional layer that is attached to reflective polarizing layer 16 on a surface opposite bonding layer 14. In one embodiment, polymeric layer 18 is a light directing film that includes a surface structure that redirects off-axis light in a direction closer to the axis of the display. This increases the amount of light propagating on-axis through the display, thus increasing the brightness of the image seen by the viewer. One example of a light directing layer is a prismatic brightness enhancing layer, which has a number of prismatic ridges that redirect the illumination light, through refraction and reflection. Examples of prismatic brightness enhancing layers that may be used in optical assembly 10 include the Vikuiti™ BEFII and BEFIII family of prismatic films available from 3M Company, St. Paul, Minn., including BEFII 90/24, BEFII 90/50, BEFIIIM 90/50, and BEFIIIT. The 90/24 refers to a prism peak angle of 90 degrees and a prism peak spacing of 24 micrometers, while the 90/50 refers to a prism peak angle of 90 degrees and a prism peak spacing of 50 micrometers. In another embodiment, polymeric layer 18 is a gain diffusing layer, for example, a layer containing micrometer-size particles that provides diffusion and directing of light. In further embodiments, polymeric layer 18 is a flat film (e.g., a protective film) or has a structured or microstructured surface including any of regular or irregular prismatic patterns, an annular prismatic pattern, a cube-corner pattern, any lenticular microstructure, or combinations thereof.

Display Device 100

Figure 2:
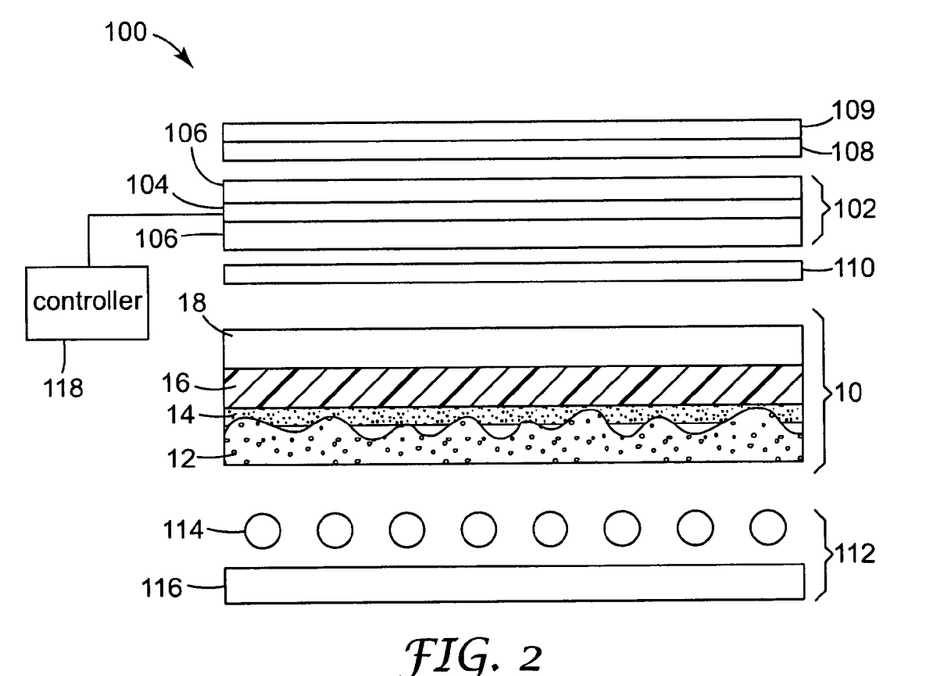
FIG. 2 is a schematic cross-sectional view of a direct-lit display device incorporating the optical assembly of FIG. 1.

FIG. 2 is a schematic cross-sectional view of exemplary direct-lit display device 100. Display device 100 includes liquid crystal (LC) panel 102 comprising LC layer 104 disposed between panel plates 106. Display device 100 also includes upper polarizer 108 with optional layer 109 attached thereto, lower polarizer 110, light source region 112 including light sources 114 and reflector 116, and controller 118. Controller 118 is connected to LC layer 104 of LC panel 102. Optical assembly 10 is incorporated into display device 100 and is disposed between light source region 112 and LC panel 102.

Display device 100 may be used, for example, in an LCD monitor or LCD-TV. The operation of display device 100 is based on the use of LC panel 102, which typically comprises an LC layer 104 disposed between panel plates 106. Plates 106 are often formed of glass, and may include electrode structures and alignment layers on their inner surfaces for controlling the orientation of the liquid crystals in LC layer 104. The electrode structures are commonly arranged so as to define LC panel pixels, areas of the LC layer where the orientation of the liquid crystals can be controlled independently of adjacent areas. A color filter may also be included with one or more of plates 106 for imposing color on the image displayed.

Upper absorbing polarizer 108 is positioned above LC layer 104 and lower absorbing polarizer 110 is positioned below LC layer 104. In the illustrated embodiment, the upper and lower absorbing polarizers are located outside LC panel 102. Absorbing polarizers 108 and 110 and LC panel 102 in combination control the transmission of light from light source region 112 through display 100 to the viewer. In some LC displays, absorbing polarizers 108 and 110 may be arranged with their transmission axes perpendicular. When a pixel of LC layer 104 is not activated, it does not change the polarization of light passing therethrough. Accordingly, light that passes through lower absorbing polarizer 110 is absorbed by upper absorbing polarizer 108 when absorbing polarizers 108 and 110 are aligned perpendicularly. When the pixel is activated, on the other, hand, the polarization of the light passing therethrough is rotated, so that at least some of the light that is transmitted through lower absorbing polarizer 110 is also transmitted through upper absorbing polarizer 108. Selective activation of the different pixels of LC layer 104, for example by controller 118, results in the light passing out of the display at certain desired locations, thus forming an image seen by the viewer. Controller 118 may include, for example, a computer or a television controller that receives and displays television images. One or more optional layers 109 may be provided over upper absorbing polarizer 108, for example to provide mechanical and/or environmental protection to the display surface. In one exemplary embodiment, layer 109 may include a hardcoat over absorbing polarizer 108.

It will be appreciated that some types of LC displays may operate in a manner different from that described above. For example, the absorbing polarizers may be aligned parallel and LC panel 102 may rotate the polarization of the light when a pixel is in an unactivated state. Regardless, the basic structure of such displays remains similar to that described above.

Light source region 112 includes a number of light sources 114 that generate the light that illuminates LC panel 102. Light sources 114 used in a LCD-TV or LCD monitor are often linear, cold cathode fluorescent tubes that extend across display device 100. Other types of light sources may be used, however, such as filament or arc lamps, light emitting diodes (LEDs), non-linear cold cathode fluorescent tubes, flat fluorescent panels, or external electrode fluorescent lamps. This list of light sources is not intended to be limiting or exhaustive, but only exemplary.

Light source region 112 may also include reflector 116 for reflecting light propagating downwards from light sources 114, in a direction away from LC panel 102. Reflector 116 may also be useful for recycling light within display device 100, as is explained below. Reflector 116 may be a specular reflector or may be a diffuse reflector. One example of a specular reflector that may be used as reflector 116 is Vikuiti™ Enhanced Specular Reflection (ESR) film available from 3M Company, St. Paul, Minn. Examples of suitable diffuse reflectors include polymers, such as polyethylene terephthalate (PET), polycarbonate (PC), polypropylene, polystyrene and the like, loaded with diffusely reflective particles, such as titanium dioxide, barium sulphate, calcium carbonate and the like. Other examples of diffuse reflectors, including microporous materials and fibril-containing materials, are discussed in co-owned U.S. Patent Application Publication 2003/0118805 A1, which is incorporated herein by reference.

Assembly 10 is positioned between light source region 112 and LC panel 102. As described above, the light management layers affect the light propagating from light source region 112 so as to improve the operation of display device 100. It is desirable to utilize optical assemblies such as assembly 10, which include reflective polarizing layer 16 attached to diffuser plate 12 on a non-uniform surface. The use of such optical assemblies decreases the assembly time for LCD televisions, for example, because there are fewer components to assemble. Also, providing assembly 10 as a unitary article better facilitates automated assembly of the components of the display device 100.

ADDITIONAL EMBODIMENTS

Figure 3:
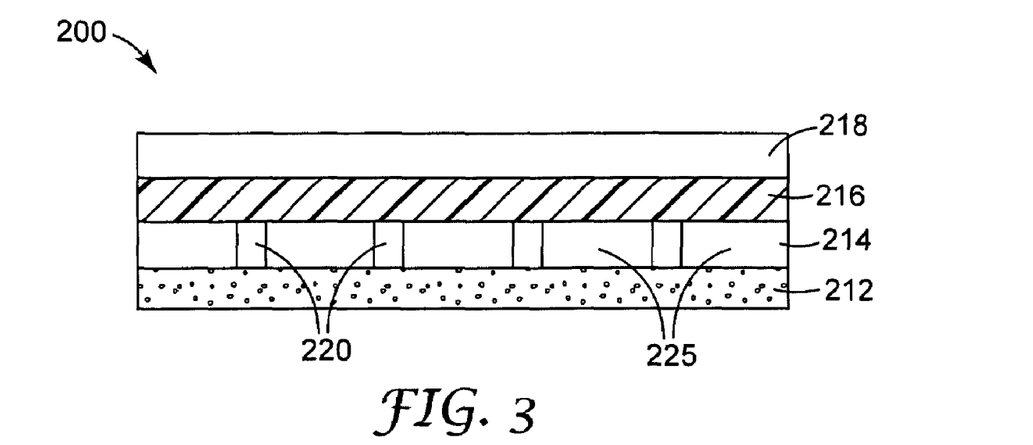
FIG. 3 is a schematic cross-sectional view of an optical assembly according to another embodiment of the present invention.

While assembly 10 includes a non-uniform surface formed by topographical features 20 to define voids 25, any structure may be provided in the intermediate region between the light diffusing layer and the reflective polarizing layer to define voids or air gaps. For example, FIG. 3 shows optical assembly 200 according to another embodiment of the present invention. Assembly 200 may be incorporated in display system 100 (FIG. 2) in place of assembly 10. Assembly 200 includes light diffusing layer 212, structured intermediate layer 214, reflective polarizing layer 216, and optional polymeric layer 218. Reflective polarizing layer 216 is attached to light diffusing layer 212 via structured intermediate layer 214. Light diffusing layer 212, structured intermediate layer 214, and reflective polarizing layer 216 may be coupled to each other via an adhesive layer between each of the layers (either completely coating or around a periphery of the layers). Alternatively, reflective polarizing layer 216 and light diffusing layer 212. may be coupled to structured intermediate film 214 by solvent bonding, or ultrasonic welding. Polymeric layer 218 is optionally attached to reflective polarizing layer 216 on the surface opposite structured intermediate layer 214.

Structured intermediate layer 214 includes structures 220 that define voids 225. Voids 225 provide a partial air gap between light diffusing layer 212 and reflective polarizing layer 216. Voids 225 allow assembly 200 to have an optical performance substantially similar to that of an assembly including a full air gap between light diffusing layer 212 and reflective polarizing layer 216. While structured intermediate layer 214 is shown with structures 220 defining voids 225 that extend through structured intermediate layer 214, structured intermediate layer 214 may have any configuration that defines voids or air gaps between light diffusing layer 212 and reflective polarizing layer 216.

Light diffusing layer 212, reflective polarizing layer 216, and polymeric layer 218 may be made of similar materials or have similar configurations as light diffusing layer 12, reflective polarizing layer 16, and polymeric layer 218 (FIG. 1), respectively, as set forth above. Structured intermediate layer 214 may be made of a polymeric material including poly(meth)acrylics, poly(meth)acrylates, polycarbonates, polyurethanes, polyesters, polyolefins, polystyrenes, polycycloolefins, epoxy polymers, polyamides, polyimides, polysulfones, poly(vinyl chlorides), polysiloxanes, or silicone polymers, or copolymers or blends thereof. Examples include acrylic copolymers; polymethylmethacrylate; an acrylonitrile butadiene styrene copolymer; a styrene acrylonitrile copolymer, poly(vinylcyclohexane); polymethyl methacrylate/poly(vinylfluoride) blends; poly(ethylene); poly(propylene); PET; PEN; a poly(phenylene oxide) blend; a styrenic block copolymer; a polycarbonate/PET blend; a vinyl acetate/polyethylene copolymer; a cellulose acetate; a fluoropolymer; a poly(styrene)-poly(ethylene) copolymer; or copolymers or blends thereof. In one embodiment, the structured intermediate layer 214 comprises an acrylic sheet having the ACRYLITE® brand (from Cyro Industries, Rockaway, N.J.). In another embodiment, the structured intermediate layer 214 comprises polymethylmethacrylate or a copolymer of methyl methacrylate and styrene. In an alternative embodiment, structured intermediate layer 214 is configured as an adhesive perimeter bond such that the bond and the facing major surfaces of light diffusing layer 212 and reflective polarizing layer 216 define a void between light diffusing layer 212 and reflective polarizing layer 216.

Figure 4:
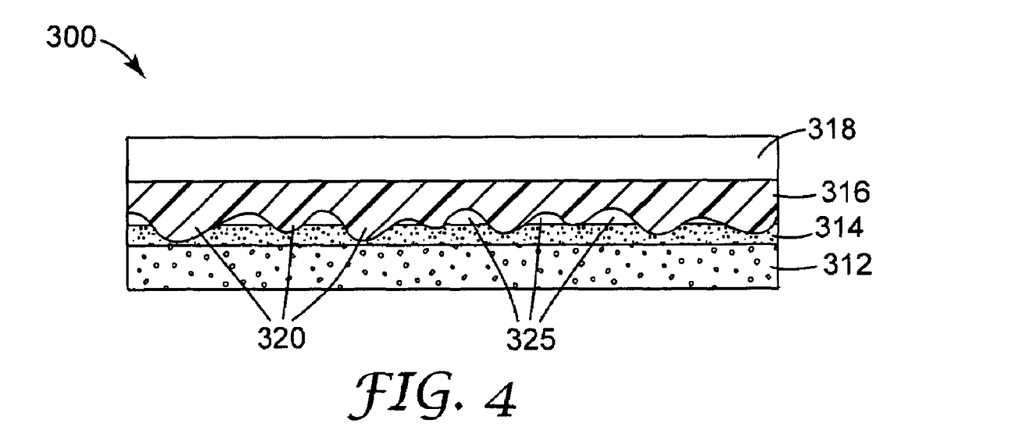
FIG. 4 is a schematic cross-sectional view of an optical assembly according to a further embodiment of the present invention.

FIG. 4 shows optical assembly 300 according to a further embodiment of the present invention. Assembly 300 may be incorporated in display system 100 (FIG. 2) in place of assembly 10. Assembly 300 includes light diffusing layer 312, bonding layer 314, reflective polarizing layer 316, and optional polymeric layer 318. Reflective polarizing layer 316 is attached to light diffusing layer 312 via bonding layer 314. Polymeric layer 318 is optionally attached to reflective polarizing layer 316 on the surface opposite light diffusing layer 312. Light diffusing layer 312, bonding layer 314, reflective polarizing layer 316, and polymeric layer 318 may be made of similar materials to or have similar configurations as light diffusing layer 12, bonding layer 14, reflective polarizing layer 16, and polymeric layer 18 (FIG. 1), respectively, as set forth above.

Reflective polarizing layer 316 includes a non-uniform or textured surface. A plurality of topographical features 320 form the non-uniform surface of reflective polarizing layer 316. Topographical features 320 may be spaced periodically or aperiodically, may have similar or differing heights, and may have curved or pointed contours to form a matte or textured surface. In one embodiment, the average roughness (Ra) of the non-uniform surface is in the range of about 0.5-10 µm. The non-uniform surface of reflective polarizing layer 316 may be formed by, inter alia, microreplication, roughening, or sandblasting of the surface.

Reflective polarizing layer 316 is attached to light diffusing layer 312 such that light diffusing layer 312 is bonded with topographical features 320 of the non-uniform surface. In one embodiment, bonding layer 314 has a thickness that is less than a height of topographical features 320. In another embodiment, bonding layer 314 has a thickness that is about 5-75% of a height of topographical features 320. When reflective polarizing layer 316 is attached to light diffusing layer 312 via bonding layer 314 according to the present invention, air gaps or voids 325 are defined between adjacent topographical features on the non-uniform surface of reflective polarizing layer 316. Bonding layer 314, topographical features 320, and voids 325 form an intermediate region between light diffusing layer 312 and reflective polarizing layer 316. Voids 325 provide a partial air gap between light diffusing layer 312 and reflective polarizing layer 316. Voids 325 allow assembly 300 to have an optical performance substantially similar to that of an assembly including a full air gap between light diffusing layer 312 and reflective polarizing layer 316.

EXAMPLES

Preparation of Optical Assemblies

Example 1 (1)

The reflective polarizing layer used was ½-D400, which is a 3M™ Vikuiti™ Dual Brightness Enhancement Film (DBEF-Q) laminated to one sheet of approximately 130 µm thick polycarbonate (60% haze) using a radiation-curable adhesive. The polycarbonate had a matte surface. The light diffusing layer was a 2.0 mm light diffuser plate with a non-uniform surface which is commercially available under model RM802 from Sumitomo Chemical Company, Tokyo, Japan. The light diffusing layer comprised a copolymer of methyl methacrylate and styrene (hereinafter referred to as MS). The surface characteristics of Surface 1 and Surface 2 of the RM802 light diffusing layer measured by stylus profilometry are shown in Table 1 below. The reflective polarizing layer was attached to Surface 1 of the light diffusing layer using an approximately 15 μm thick layer of pressure sensitive adhesive made by 3M Corporation, Saint Paul, Minn. (Adhesive A). Adhesive A was a blend of 90% of a pressure sensitive adhesive, a copolymer of isooctylacrylate and acrylic acid (93:7), and 10% of a high Tg polymer, a copolymer of methylmethacrylate, butylmethacrylate, and DMA-EMA (69:25:6) and having a molecular weight of ~140,000 g/mol.

TABLE 1

| Surface Statistic | RM802 Surface 1 | RM802 Surface 2 |
|---|---|---|
| Ra | 5.75 μm | 2.48 μm |
| Rq | 7.21 μm | 3.07 μm |
| Rz | 43.22 μm | 17.94 μm |
| Rt | 44.32 μm | 18.73 μm |
| Rv | −16.90 μm | −8.29 μm |
| Rvm | −16.73 μm | −7.83 μm |
| Rp | 27.43 μm | 10.43 μm |
| Rpm | 26.50 μm | 10.11 μm |
| Rsk | 0.62 | 0.59 |

Example 2 (2)

Example 2 was prepared as in Example 1, except that the reflective polarizing layer included a layer of approximately 250 μm thick polycarbonate laminated to each side of the DBEF-Q film, and BEFIII 90/50, 7R (i.e., 7 μm radius of curvature) prisms coated on one of the layers of polycarbonate (DBEF-DTV).

Example 3 (3)

Example 3 was prepared as in Example 1, except that the reflective polarizing layer used was a DBEF-Q film without the sheet of approximately 130 μm thick polycarbonate laminated thereto.

Example 4 (4)

Example 4 was prepared as in Example 1, except that the reflective polarizing layer used was a DBEF-Q film with BEFII 90/24 prisms coated thereon.

Example 5 (5)

Example 5 was prepared as in Example 1, except that the reflective polarizing layer used was a DBEF-Q film with BEFIII 90/50, 7R prisms coated thereon.

Example 6 (6)

Example 6 was prepared as in Example 1, except that the reflective polarizing layer was attached to Surface 1 of the light diffusing layer using an approximately 12.7 μm thick layer of pressure sensitive adhesive (Adhesive A) and the reflective polarizing layer used was a DBEF-Q film with BEFII 90/24 prisms coated thereon.

Example 7 (7)

Example 7 was prepared as in Example 1, except that the reflective polarizing layer was attached to Surface 1 of the light diffusing layer using an approximately 6.35 μm thick layer of pressure sensitive adhesive (Adhesive A) and the reflective polarizing layer used was a DBEF-Q film with BEFII 90/24 prisms coated thereon.

Example 8 (8)

Example 8 was prepared as in Example 1, except that the reflective polarizing layer was attached to Surface 1 of the light diffusing layer using an approximately 2.54 μm thick layer of pressure sensitive adhesive (Adhesive A) and the reflective polarizing layer used was a DBEF-Q film with BEFII 90/24 prisms coated thereon.

Example 9 (9)

Example 9 was prepared as in Example 1, except that the reflective polarizing layer was attached to Surface 2 of the light diffusing layer using an approximately 12.7 μm thick layer of pressure sensitive adhesive (Adhesive A) and the reflective polarizing layer used was a DBEF-Q film with BEFII 90/24 prisms coated thereon.

Example 10 (10)

Example 10 was prepared as in Example 1, except that the reflective polarizing layer was attached to Surface 2 of the light diffusing layer using an approximately 6.35 μm thick layer of pressure sensitive adhesive (Adhesive A) and the reflective polarizing layer used was a DBEF-Q film with BEFII 90/24 prisms coated thereon.

Example 11 (11)

Example 11 was prepared as in Example 1, except that the reflective polarizing layer was attached to Surface 2 of the light diffusing layer using an approximately 2.54 μm thick layer of pressure sensitive adhesive (Adhesive A) and the reflective polarizing layer used was a DBEF-Q film with BEFII 90/24 prisms coated thereon.

Comparative Example 1 (C-1)

Comparative Example 1 was prepared as in Example 1, except that the reflective polarizing layer was free floating on the diffuser plate to provide a full air gap between the reflective polarizing layer and the light diffuser plate.

Comparative Example 2 (C-2)

Comparative Example 2 was prepared as in Example 1, except that the reflective polarizer was completely optically coupled to the light diffuser plate using 3M 9483 adhesive from 3M Corporation, Saint Paul, Minn., which is an approximately 80 μm thick layer of acrylic pressure sensitive adhesive.

Comparative Example 3 (C-3)

Comparative Example 3 was prepared as in Example 2, except that the reflective polarizing layer was free floating on the light diffuser plate to provide a full air gap between the reflective polarizing layer and the light diffuser plate.

Comparative Example 4 (C-4)

Comparative Example 4 was prepared as in Example 2, except that the reflective polarizing layer was completely optically coupled to the light diffuser plate using 3M 9483 adhesive.

Comparative Example 5 (C-5)

Comparative Example 5 was prepared as in Example 3, except that the reflective polarizing layer was free floating on the light diffuser plate to provide a full air gap between the reflective polarizing layer and the light diffuser plate.

Comparative Example 6 (C-6)

Comparative Example 6 was prepared as in Example 3, except that the reflective polarizing layer was completely optically coupled to the light diffuser plate using 3M 9483 adhesive from 3M Corporation, Saint Paul, Minn., which is an acrylic pressure sensitive adhesive.

Comparative Example 7 (C-7)

Comparative Example 7 was prepared as in Example 4, except that the reflective polarizing layer was free floating on the light diffuser plate to provide a full air gap between the reflective polarizing layer and the light diffuser plate.

Comparative Example 8 (C-8)

Comparative Example 8 was prepared as in Example 4, except that the reflective polarizing layer was completely optically coupled to the light diffuser plate using 3M 9483 adhesive from 3M Corporation, Saint Paul, Minn., which is an acrylic pressure sensitive adhesive.

Comparative Example 9 (C-9)

Comparative Example 9 was prepared as in Example 5, except that the reflective polarizing layer was free floating on the light diffuser plate to provide a full air gap between the reflective polarizing layer and the light diffuser plate.

Comparative Example 10 (C-10)

Comparative Example 10 was prepared as in Example 5, except that the reflective polarizing layer was completely optically coupled to light diffuser plate using 3M 9483 adhesive from 3M Corporation, Saint Paul, Minn., which is an acrylic pressure sensitive adhesive.

A summary of the optical assemblies described above is provided in Table 2.

TABLE 2

| Example | Reflective Polarizer | Adhesive | Diffusing Layer |
|---|---|---|---|
| 1 | ½-D400 | Adhesive A (15 μm) | Sumitomo RM802 Side 1 |
| 2 | DBEF-DTV | Adhesive A (15 μm) | Sumitomo RM802 Side 1 |
| 3 | DBEF-Q | Adhesive A (15 μm) | Sumitomo RM802 Side 1 |
| 4 | DBEF-Q, BEFII 90/24 prisms | Adhesive A (15 μm) | Sumitomo RM802 Side 1 |
| 5 | DBEF-Q, BEFIII 90/50, 7R prisms | Adhesive A (15 μm) | Sumitomo RM802 Side 1 |
| 6 | DBEF-Q, BEFII 90/24 prisms | Adhesive A (12.7 μm) | Sumitomo RM802 Side 1 |
| 7 | DBEF-Q, BEFII 90/24 prisms | Adhesive A (6.35 μm) | Sumitomo RM802 Side 1 |
| 8 | DBEF-Q, BEFII 90/24 prisms | Adhesive A (2.54 μm) | Sumitomo RM802 Side 1 |
| 9 | DBEF-Q, BEFII 90/24 prisms | Adhesive A (12.7 μm) | Sumitomo RM802 Side 2 |
| 10 | DBEF-Q, BEFII 90/24 prisms | Adhesive A (6.35 μm) | Sumitomo RM802 Side 2 |
| 11 | DBEF-Q, BEFII 90/24 prisms | Adhesive A (2.54 μm) | Sumitomo RM802 Side 2 |
| C-1 | ½-D400 | N/A | Sumitomo RM802 Side 1 |
| C-2 | ½-D400 | 3M 9483 (80 μm) | Sumitomo RM802 Side 1 |
| C-3 | DBEF-DTV | N/A | Sumitomo RM802 Side 1 |
| C-4 | DBEF-DTV | 3M 9483 (80 μm) | Sumitomo RM802 Side 1 |
| C-5 | DBEF-Q | N/A | Sumitomo RM802 Side 1 |
| C-6 | DBEF-Q | 3M 9483 (80 μm) | Sumitomo RM802 Side 1 |
| C-7 | DBEF-Q, BEFII 90/24 prisms | N/A | Sumitomo RM802 Side 1 |
| C-8 | DBEF-Q, BEFII 90/24 prisms | 3M 9483 (80 μm) | Sumitomo RM802 Side 1 |
| C-9 | DBEF-Q, BEFIII 90/50, 7R prisms | N/A | Sumitomo RM802 Side 1 |
| C-10 | DBEF-Q, BEFIII 90/50, 7R prisms | 3M 9483 (80 μm) | Sumitomo RM802 Side 1 |

Effective Transmission

The effective transmission was measured for each of the optical assemblies prepared. A Teflon cube with walls about 0.6 cm thick and about 11 cm on a side was provided. The cube was illuminated from its interior via a high intensity fiber-optic light pipe. The highly diffusing translucent walls of the cube provided reference surfaces of highly uniform (Lambertian) luminance. A luminance meter, centered relative to an external cube face and positioned along a normal to the cube face, recorded the luminance on the cube face with and without each of the optical assemblies provided between the luminance meter and the cube face. The ratio of the luminance with the optical assembly included to that without the optical assembly included is the effective transmission. The results of the effective transmission measurement for each of samples prepared are provided in Table 3.

As is shown by this table, the effective transmissions of optical assemblies prepared in accordance with the present invention (Examples 1-5) are substantially similar to the effective transmissions of the corollary comparative example optical assemblies having a full air gap between the light diffusing layer and the reflective polarizing layer (Comparative Examples 1, 3, 5, 7, and 9, respectively). In addition, optical assemblies prepared in

TABLE 3

| Example | Effective Transmission |
|---|---|
| 1 | 1.559 |
| 2 | 1.787 |
| 3 | 1.604 |
| 4 | 1.909 |
| 5 | 1.826 |
| 6 | 1.822 |
| 7 | 1.927 |
| 8 | 1.948 |
| 9 | 1.470 |
| 10 | 1.809 |
| 11 | 1.931 |
| C-1 | 1.619 |
| C-2 | 1.499 |
| C-3 | 1.924 |
| C-4 | 1.459 |
| C-5 | 1.608 |
| C-6 | 1.624 |
| C-7 | 1.964 |
| C-8 | 1.418 |
| C-9 | 1.972 |
| C-10 | 1.567 | accordance with the present invention (Examples 1-11) generally show improved effective transmissions over the corollary comparative examples wherein the reflective polarizing layer is completely coupled to the light diffusing layer.

Speckle Test

At regions where bonding layer 14 optically couples light diffusing layer 12 and optional polymeric layer 18 (i.e., where the peaks of the non-uniform surface of light diffusing layer 12 touch bonding layer 14), a difference in brightness is observed compared with regions above voids 25 between light diffusing layer 12 and bonding layer 14. This speckle defect is typically more apparent to an observer at higher viewing angles where the regions above voids 25 appear less bright than the regions with optical coupling between light diffusing layer 12 and optional polymeric layer 18. The speckle defect exists due to the inability of optional polymeric layer 18 to function as a light directing layer when optically coupled to light diffusing layer 12.

Test samples of some of the above examples (examples 6-11 and comparative examples C-7 and C-8) were tested to inspect for the speckle defect. The example was tested in a display constructed with the following components starting with component furthest from the eye: (1) a light box including diffuse white light with a white acrylic bottom diffuser and a fluorescent bulb (e.g., General Electric F15T8-SP41); (2) a light box diffuser made of a white acrylic with a minimum haze of 98% and a brightness in the range of 150-300 cd/m$^2$; (3) TEST SAMPLE; (4) a top diffuser filter (e.g., Keiwa 100-BMU1S) having nominal haze of 65%; (5) a polarizer laminated glass layer (e.g., SanRitz HLC2-5618) having a transmittance of 35-45% and polarization efficiency of $\geqq 99.9\%$; and (6) an approximately 38 cm XGA black matrix layer having a pixel size of 0.298 mm by 0.100 mm, a black matrix (BM) width of 0.010 mm, and an aperture ratio of 84%. The criteria for passing the speckle test was whether the speckle defect was objectionable at a horizontal viewing angle within ±80°, a vertical viewing angle within ±80°, and a viewing distance of at least 50 cm from the example to the eye.

TABLE 4

| Example | Speckle Test |
|---|---|
| 6 | Fail |
| 7 | Pass |
| 8 | Pass |
| 9 | Fail |
| 10 | Fail |
| 11 | Pass |
| C-7 | Pass |
| C-8 | Pass |

The speckle defect may be made less apparent by changing the spatial frequency of voids 25. For example, by providing a single void 25 throughout the entire usable viewing area of the display, the speckle defect would not be apparent. Also, the spatial frequency of the voids could be increased to a point at which the individual regions of differing brightness are no longer discernable. With 100% contrast between the brightness above voids 25 and above where bonding layer 14 optically couples light diffusing layer 12 and optional polymeric layer 18, a spatial frequency of approximately 40 cycles/degree (corresponding to a 100 μm distance between nearest optically coupled regions at a viewing distance of 0.25 meters) would be necessary to reduce the appearance of the speckle defect to an acceptable level based on typical contrast response functions. The required distance between nearest optically coupled regions could be increased by increasing the viewing distance or decreasing the contrast between the brightness above voids 25 and above the optically coupled regions.

In summary, the present invention is an optical assembly that includes a light diffusing layer attached to a reflective polarizing layer. An intermediate region between the light diffusing layer and the reflective polarizing layer includes an intermediate structure that defines voids between the light diffusing layer and the reflective polarizing layer. This configuration allows several optical layers to be incorporated into an optical system as a single assembly. This reduces the time required to assemble an optical system including these layers and decreases the possibility of damage to the individual layers during assembly of the layers and integration into the optical system.

Although the present invention has been described with reference to preferred embodiments, workers skilled in the art will recognize that changes may be made in form and detail without departing from the spirit and scope of the invention.

The invention claimed is:

1. An optical assembly comprising:
   a light diffusing layer;
   a reflective polarizing layer attached to the light diffusing layer; and
   an intermediate region between the light diffusing layer and the reflective polarizing layer, the intermediate region including an intermediate structure that defines voids between the light diffusing layer and the reflective polarizing layer, and wherein the intermediate structure comprises a non-uniform surface on the reflective polarizing layer that is formed by a plurality of topographical features that extend into the intermediate region, wherein adjacent topographical features define the voids;
   wherein the non-uniform surface on the reflective polarizing layer comprises an average roughness of about 0.5 to 10 μm.

2. The optical display assembly of claim 1, wherein the intermediate region comprises an intermediate layer including a structure that defines the voids.

3. The optical assembly of claim 1, wherein the reflective polarizing layer is attached to the light diffusing layer with an adhesive material.

4. The optical assembly of claim 3, wherein the adhesive material is selected from the group consisting of a pressure sensitive adhesive, a heat-activated adhesive, a hot melt adhesive, and a radiation-curable adhesive.

5. The optical assembly of claim 1, wherein the reflective polarizing layer is attached to the light diffusing layer with bonding selected from the group consisting of perimeter bonding, solvent bonding, ultrasonic welding, and laser welding.

6. The optical assembly of claim 1, wherein the reflective polarizing layer comprises a plurality of alternating polymeric layers.

7. The optical assembly of claim 6, wherein the reflective polarizing layer comprises a dual brightness enhancement film (DBEF).

8. The optical assembly of claim 6, wherein the reflective polarizing layer comprises a diffusely reflective polarizing film (DRPF).

9. The optical assembly of claim 1, and further comprising:
   a light directing layer disposed on the reflective polarizing layer opposite the intermediate region.

10. An optical display assembly comprising:
    a light gating device;
    a light source; and
    an optical element disposed between the light source and the light gating device, the optical element comprising:
       a light diffusing layer;
       a reflective polarizing layer attached to the light diffusing layer; and
          an intermediate region between the light diffusing layer and the light management layer, the intermediate region including an intermediate structure that defines voids between the light diffusing layer and the reflective polarizing layer, and wherein the intermediate structure comprises a non-uniform surface on the reflective polarizing layer that is formed by a plurality of topographical features that extend into the intermediate region, wherein adjacent topographical features define the voids;
    wherein the non-uniform surface on the reflective polarizing layer comprises an average roughness of about 0.5 to 10 μm.

11. The optical display assembly of claim 10, wherein the light gating device is a liquid crystal display (LCD) panel.

12. The optical display assembly of claim 10, wherein the reflective polarizing layer is attached to the light diffusing layer with an adhesive material.

13. The optical display assembly of claim 10, wherein the intermediate region comprises an intermediate layer including a structure that defines the voids.

* * * * *

UNITED STATES PATENT AND TRADEMARK OFFICE
CERTIFICATE OF CORRECTION

| | | |
|---|---|---|
| PATENT NO. | : 7,924,368 B2 | Page 1 of 1 |
| APPLICATION NO. | : 11/297625 | |
| DATED | : April 12, 2011 | |
| INVENTOR(S) | : Ryan T Fabick | |

It is certified that error appears in the above-identified patent and that said Letters Patent is hereby corrected as shown below:

Column 6,
Line 35, Delete "isobomyl" and insert -- isobornyl --, therefor.

Line 35, Delete "isobomyl" and insert -- isobornyl --, therefor.

Column 7,
Line 46, Delete "pheynl" and insert -- phenyl --, therefor.

Column 11,
Line 33, Delete "212." and insert -- 212 --, therefor.

Signed and Sealed this
Fourteenth Day of February, 2012

David J. Kappos
*Director of the United States Patent and Trademark Office*